May 9, 1933.     F. C. BIGGERT, JR     1,908,307
UNIVERSAL COUPLING
Filed Oct. 11, 1929
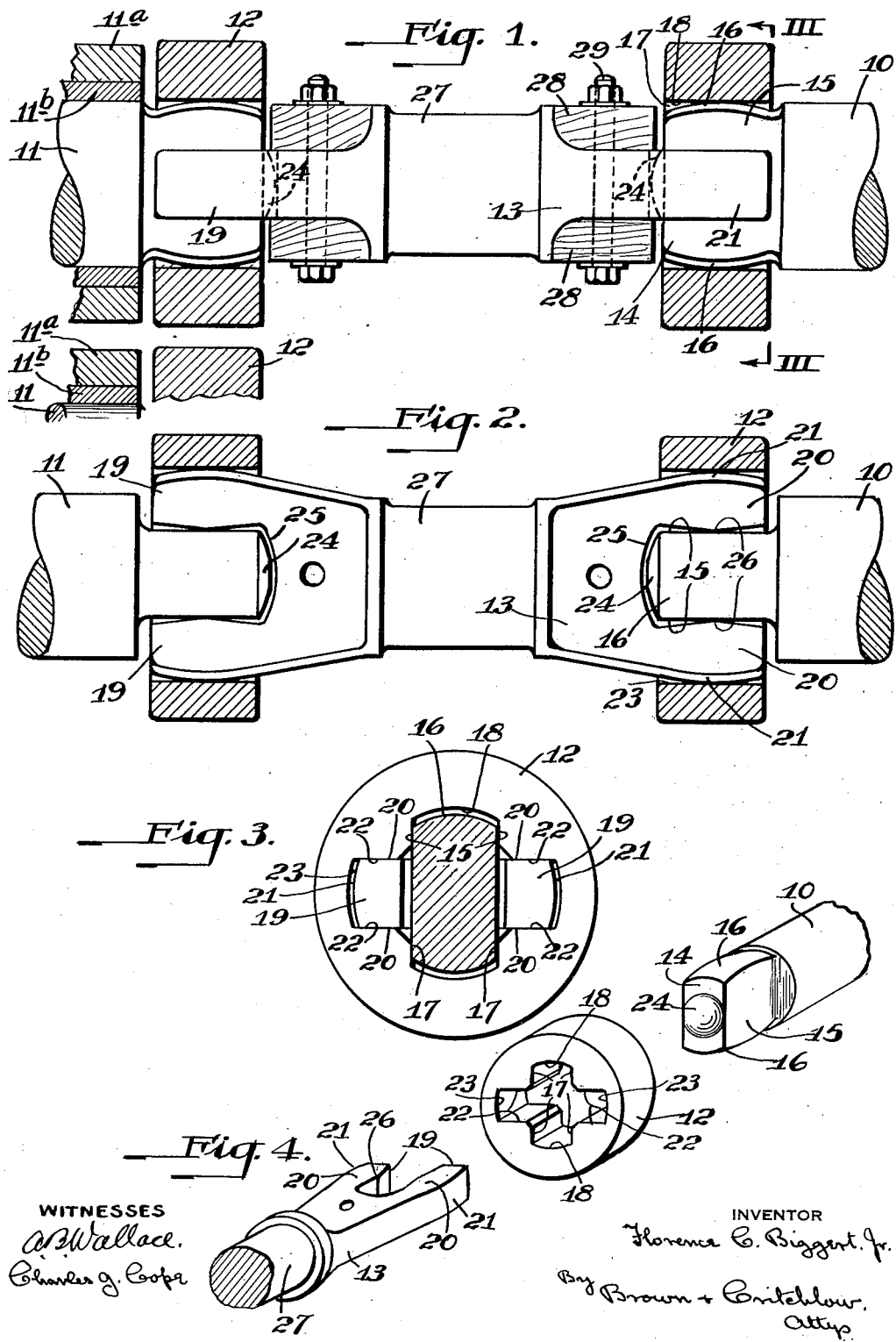

Patented May 9, 1933

1,908,307

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

UNIVERSAL COUPLING

Application filed October 11, 1929. Serial No. 398,926.

My invention pertains to universal couplings, and, while not limited to such use, relates especially to universal couplings adapted to be employed in rolling mills, as, for instance, for connecting two rolls disposed side by side, connecting a roll with its pinion shaft, etc.

It is an object of my invention to provide such a coupling which will be of an especially economical, simple and strong construction, and which will at the same time transmit torque with a high degree of efficiency and without any tendency towards undue wear of the engaging parts. Another object of my invention is to provide a universal coupling which may be disassembled readily and without the necessity of endwise movement of the members which are coupled thereby, thus, for example, facilitating a change of rolls when the coupling is employed between two rolls of a rolling mill. A further object is to provide a universal coupling in which lost motion between the parts is reduced to a minimum and which will operate relatively silently. And still other objects will appear from the following specification and the claims annexed thereto.

As an example of an embodiment of my invention, I have described in the following specification, and shown in the accompanying drawing, a universal coupling constructed in accordance therewith. However, it is to be understood that the invention may be embodied in other forms, and changes made in the form described and shown, without exceeding the scope thereof as defined in the appended claims.

In the drawing:

Figure 1 is a side elevation of the universal coupling, the connecting members thereof being shown in section;

Figure 2 is a plan of the same, the spacing members being removed;

Figure 3 is a section taken on the line III—III of Fig. 1, looking in the direction of the arrows; and Figure 4 is a perspective view showing the parts constituting one end of the coupling separated from one another.

The coupling comprises a driving element, a driven element, an intermediate element, and two connecting members, one of which latter is disposed at each end of the intermediate element in association with the end of the adjacent driving or driven element. The driving, driven and intermediate elements are disposed end to end, to a certain extent in line, and they and the connecting members are provided with cooperating faces whereby torque is transmitted between a driving or driven element and a connecting member and between such connecting member and the intermediate element. Thus the torque is transmitted between a driving or driven element and the intermediate element through the intermediary of the connecting member. The construction is such that the connecting members are capable of angular movement with respect to both the driving and driven elements and the intermediate element; so that such intermediate element is capable of angular movement in any direction with respect to the driving and driven elements with which its ends are associated.

Referring now to the particular embodiment of my invention shown in the drawing, 10 and 11 designate elements between which torque is to be transmitted. They may, for instance, be the necks of rolls disposed side by side in a rolling mill, and are shown as such. Ordinarily, the rolls will be in pairs, as indicated at the left of Fig. 1, where 11a designates the bearing blocks for the roll necks, and 11b the bushings in such necks. Either element, of course, may be the driven element, though for the purposes of this description, 10 is referred to as the driving, and 11 as the driven, element. Associated with the end of each of the elements 10 and 11 is a connecting member 12, the latter having torque-transmitting engagement with portions of such elements and at the same time being capable of angular movement with respect to the latter in a plane parallel with that of such engagement. An intermediate element 13 is disposed endwise between the driving and driven elements and has, at each end, portions which make torque-transmitting engagement with the adjacent connecting member 12 in a plane at right angles to the plane of engagement of such member with the driving or driven element, the intermediate element at the same time being capable of angular movement, in a plane parallel with the plane of its engagement therewith, with respect to each connecting member. Thus torque is transmitted from the driving element 10 to its associated connecting member 12, thence to the intermediate element 13, thence to the other connecting member 12, and thence to the driven element 11. At the same time, the intermediate element is permitted to assume various angular positions with respect to the driving and driven elements, so that power is transmitted in spite of the fact that the driving and driven elements may be materially out of alignment or at an angle with each other.

The construction of each end of the coupling is identical; so that a description of one end will suffice. Taking the right hand end, the driving element 10 is formed with an end member taking the form of a tongue 14 having the sides thereof made flat so as to form surfaces 15 which are parallel with a radius of the roll. The edges of such tongue are curved lengthwise of the roll, as indicated at 16. The connecting member 12 is formed with a diametral slot for receiving the tongue 14, the side faces 17 of such slot being engaged with the faces 15 of the tongue so that torque is transmitted through the tongue to the connecting member 12. The slot is of such dimensions that its ends 18 are engaged by the curved edges 16 of the tongue 14; so that it is possible for the connecting member to have angular movement with respect to the tongue in a plane parallel to that of the engagement of the faces 15, 17.

The intermediate element 13 becomes, of course, a driven element with regard to the driving element 10 and a driving element with regard to the driven element 11. Considering still the right hand end of the coupling, such end of the intermediate element is formed with end members taking the form of a pair of lugs 19 having the sides thereof made flat to form faces 20 which are disposed parallel with a radius of the intermediate element, the edges of these lugs being curved lengthwise of the intermediate member, as indicated at 21. The lugs are spaced sufficiently apart to admit the tongue 14 between them, and are of such length, in the direction of the diameter of the device, as to have a torque resisting strength equal to that of the tongue 14. The connecting member 12 is formed with a second diametral slot, of greater length than the first-named slot, adapted to receive the lugs 19 and having the side faces 22 thereof shaped for flat engagement by the faces 20 of the lugs. The slot is of such dimensions that its ends 23 are engaged by the curved edges 21 of the lugs 19. Thus, by the engagement of the faces 22 of the connecting member with the faces 20 of the lugs 19, torque is transmitted from the connecting member to the intermediate element 13. At the same time, by reason of the curved engagement of the edges 21 of the lugs 19 with the ends of the slots in the connecting member, angular movement of the intermediate element with respect to the connecting member is permitted.

From the above it will be noted that torque is transmitted from the driving element 10 to its connecting member 12 through the faces 15, 17, and from such connecting member 12 to the intermediate element 13 through the faces 20, 22. The driving engagement being flat and over a material area there is no opportunity for binding and no undue tendency towards wear, and quietness of operation is insured. Because of the curved engagement of the edges 16 of the tongue 14, and the edges 21 of the slots 19, with the ends of the respective slots in the connecting member 12, such connecting member can have angular movement with respect to the driving element 10 in one plane, while the intermediate element 13 can have angular movement with respect to the connecting member 12 in a plane at right angles to the first-named plane. Thus the intermediate element 13, which is a driven element when considered in connection with the driving element 10, can assume any required angular position with respect to such driving element. Similar conditions prevail, in connection with the driven element 11, at the opposite end of the coupling.

In order to minimize end play of the intermediate element 13, and thereby further promote quietness of the operation of the device, the tongues 14 of the driving and driven elements are formed with convex bearing projections 24 adapted to engage against bearing portions 25 with which the intermediate element 13 is formed between each pair of lugs 19. For a like purpose, the inner edges of the lugs 19 are made convex, as indicated at 26, so as to make line contact with the faces 15 of the tongues 14, thereby preventing material lateral movement of the intermediate element with respect to such tongues 14, while at the same time permitting the angular movements of the intermediate element.

The intermediate element 13 is shown as formed at its center with a bearing portion 27 for mounting in the bearing of a suitable spindle carrier, of well known construction, which takes the weight of such intermediate element. Secured to each end of the intermediate element is a pair of blocks 28 the ends of which engage the face of the adjacent connecting member 12, thereby enclosing such member between the blocks and the end of the adjacent driving or driven element. The blocks 28 are retained in position by bolts 29 which pass through the intermediate element. It will be seen that by removing the bolts and the blocks 28 it becomes possible to slide the connecting members 12 towards the center of the coupling thereby disengaging them from the tongues 14 of the driving and driven elements. Thereupon the intermediate element can be disengaged by merely slipping the lugs 19 off from the tongues 14. Thus the disassembling of the coupling is very easily and quickly performed, and without the necessity of any endwise movement of the driving or driven elements. This is a considerable advantage in many uses of the coupling. For instance, where the coupling is employed in a rolling mill, it facilitates changing of the rolls.

The coupling of my invention, by the flat driving engagement of its elements, is highly efficient in the transmission of torque, and its parts have no special liability to wear. The construction by which these results are obtained is exceedingly simple and economical as to manufacture. Seeing that the tongues 14 can, if desired, be formed as parts of the driving and driven elements themselves, there are, in the coupling which has been described and shown, but three operating parts,—viz, the intermediate element and the two connecting members,—and no difficult machining operations are involved. To these are added the material advantage of ease of disassembling, above referred to.

It will be noted, in addition to the above, that the coupling herein described is not only exceedingly simple and has great torque-resisting strength, but these advantages are obtained whilst still fully meeting the requirements of rolling mill practice that the individual rolls of pairs of rolls run in close relation with each other and that the rolls be readily changeable. The ready changeability of the rolls results from the fact that the tongues 14 thereon, being of a solid cross-section of substantially uniform thickness, have sufficient strength, whilst still being of small enough width, in the direction of the diameter of the device, to permit their passage through the bearing bushings 11b when the rolls are to be changed. On the other hand, the lugs 19, forming the forks, can be of sufficient width to give a strength commensurate with that of the tongues. The limitation upon the diameter of the connecting members 12, and therefore upon the length of the slots for receiving the lugs 19, resulting from the proximity of such connecting members (as indicated at the left of Fig. 1), does not prevent the width of the lugs 19 being sufficient to give the required strength above referred to.

I claim:

1. A universal coupling comprising a driving and a driven element, one of said elements having a tongue and the other member having lugs adapted to embrace said tongue when the elements are associated end to end, and a connecting member having a cruciform aperture for receiving said tongue and lugs, whereby torque is transmitted from the driving element to said member and from said member to the driven element.

2. A universal coupling comprising a driving and a driven element, one of said elements having a tongue and the other member having lugs adapted to embrace said tongue when the elements are associated end to end, a connecting member having a cruciform aperture for receiving said tongue and lugs, whereby torque is transmitted from the driving element to said member and from said member to the driven element, and means, movably associated with one of said elements, for retaining said connecting member against endwise movement with respect to said tongue and lugs.

3. A universal coupling comprising a driving and a driven element, one of said elements having a tongue and the other member having lugs adapted to embrace said tongue when the elements are associated end to end, said lugs and tongue being formed for lateral line engagement, and a connecting member having a cruciform aperture for receiving said tongue and lugs, whereby torque is transmitted from the driving element to said member and from said member to the driven element.

4. A universal joint comprising a driving and a driven element, one of said elements having a tongue of a width not greater than the diameter of said element, thereby to permit the passage of said tongue through a bearing for receiving said element, and the other of said elements having lugs adapted to embrace said tongue in the direction of the thickness thereof, the aggregate width of said lugs being substantially equal to the width of said tongue, whereby the outer parts of said lugs, in the direction of their width, are separated by a distance greater than the width of said tongue, and a connecting member having therein a diametral slot for receiving said tongue and a second diametral slot, of greater length than said first-named slot, for receiving said lugs.

In testimony whereof, I sign my name.

FLORENCE C. BIGGERT, Jr.